(12) United States Patent
Sames et al.

(10) Patent No.: US 6,920,558 B2
(45) Date of Patent: Jul. 19, 2005

(54) METHOD AND APPARATUS FOR SECURELY AND DYNAMICALLY MODIFYING SECURITY POLICY CONFIGURATIONS IN A DISTRIBUTED SYSTEM

(75) Inventors: David L. Sames, Woodbine, MD (US); Brent S. Whitmore, York, PA (US); Brian S. Niebuhr, Columbia, MD (US); Gregg W. Tally, Ellicott City, MD (US)

(73) Assignee: Networks Associates Technology, Inc., Santa Clara, CA (US)

( * ) Notice: Subject to any disclaimer, the term of this patent is extended or adjusted under 35 U.S.C. 154(b) by 787 days.

(21) Appl. No.: 09/863,145

(22) Filed: May 22, 2001

(65) Prior Publication Data

US 2002/0138726 A1 Sep. 26, 2002

Related U.S. Application Data

(63) Continuation-in-part of application No. 09/813,419, filed on Mar. 20, 2001.

(51) Int. Cl.$^7$ .............................. H04L 9/00; H04K 1/00
(52) U.S. Cl. ...................... 713/166; 713/182; 713/201
(58) Field of Search ................................ 713/166, 182, 713/201

(56) References Cited

U.S. PATENT DOCUMENTS

| | | | | |
|---|---|---|---|---|
| 5,113,342 A | * | 5/1992 | Zamora | 704/9 |
| 5,204,961 A | * | 4/1993 | Barlow | 713/201 |
| 5,870,561 A | * | 2/1999 | Jarvis et al. | 709/238 |
| 6,115,646 A | | 9/2000 | Fiszman et al. | 700/181 |
| 6,158,010 A | * | 12/2000 | Moriconi et al. | 713/201 |
| 6,161,107 A | | 12/2000 | Stern | 707/104 |
| 6,578,037 B1 | * | 6/2003 | Wong et al. | 707/10 |
| 6,789,202 B1 | * | 9/2004 | Ko et al. | 713/201 |
| 2001/0021926 A1 | * | 9/2001 | Schneck et al. | 713/182 |
| 2002/0010709 A1 | * | 1/2002 | Culbert et al. | 707/500 |

* cited by examiner

*Primary Examiner*—Gilberto Barron
*Assistant Examiner*—A. Nobahar
(74) *Attorney, Agent, or Firm*—Zilka-Kotab, PC; Christopher J. Hamaty

(57) ABSTRACT

One embodiment of the present invention provides a system for managing security policies in a distributed computing system. Security policies include, but are not limited to, a firewall policy, a policy for file access, a policy for application access, a policy for an encryption algorithm, a policy for audit trails, and a policy for activity logging. These security policies determine access rights to a computer application. The system operates by creating multiple security policies with individual security policies specifying a differing level of security for the distributed computing system. These security policies are then distributed to each computer in the distributed computing system. Next, a specific security policy is selected for use across the distributed computing system, and each computer in the distributed computing system is directed to use the specified security policy enforcing a selected security posture.

24 Claims, 5 Drawing Sheets

METHOD AND APPARATUS FOR SECURELY AND DYNAMICALLY MODIFYING SECURITY POLICY CONFIGURATIONS IN A DISTRIBUTED SYSTEM

RELATED APPLICATION

The present application is a continuation-in-part of pending U.S. patent application Ser. No. 09/813,419 filed on Mar. 20, 2001 by inventors: David L. Sames and Gregg W. Tally, entitled "Method and Apparatus for Securely and Dynamically Managing User Attributes in a Distributed System" U.S. patent application Ser. No. 09/813,419 is included herein by reference.

GOVERNMENT LICENSE RIGHTS

This invention was made with United States Government support under contract #F30602-98-C-0012 funded by the Defense Advanced Research Projects Agency (DARPA) through Rome Laboratories. The United States Government has certain rights in the invention.

BACKGROUND

1. Field of the Invention

The present invention relates to distributed systems. More specifically, the present invention relates to a method and an apparatus for securely and dynamically modifying security policy configurations in distributed systems.

2. Related Art

The recent explosion of distributed computing systems and their attendant problems have led to many innovative solutions to ensure commonality, interoperability, and standardization.

In order to both provide authorized access and prevent unwanted access, security administrators establish security policies for distributed computing systems under their control. These security policies include firewall policies, file access policies, application access policies, encryption policies, audit trail policies, activity logging policies, and the like. Collectively, these policies can be referred to as access control policies or security policies.

Access control policies are provided to the computers within the distributed computing system. The computer and the applications running on the computer then control access to the system resources based on the access control policies.

One problem associated with distributed computing systems is providing access control policies under varying conditions. A distributed system may be under attack by an adversary and may need to change security policies quickly to prevent unwanted access. Security specialists in the military have developed an information condition (INFOCON) system similar to the well-known defense condition (DEFCON) system so that an administrator can quickly establish a different security policy in response to a specific threat level. We have broadened INFOCON to "security posture" to indicate a particular stance the system should take to a given threat condition.

Distribution of these different security policies can be difficult, however. The distribution may require considerable data to be transferred to computers within the distributed system at a time when bandwidth among the computers is severely restricted by an attack. Therefore, the cause of a new security posture can prevent the timely distribution of the new security policy in response to the new security posture.

What is needed is a method and an apparatus for distributing security policies in a distributed system that can be effectively used in response to a change in security posture.

SUMMARY

One embodiment of the present invention provides a system for managing security policies in a distributed computing system. Security policies include, but are not limited to, a firewall, a policy for file access, a policy for application access, a policy for an encryption algorithm, a policy for audit trails, and a policy for activity logging. These security policies determine access rights to a computer application. The system operates by creating multiple security policies with individual security policies specifying a differing level of security for the distributed computing system. These security policies are then distributed to each computer in the distributed computing system. Next, a specific security policy is selected for use across the distributed computing system, and each computer in the distributed computing system is directed to use the specified security policy.

In one embodiment of the present invention, the level of security includes a specific security posture.

In one embodiment of the present invention, the system uses secure communications for distributing the security policies to each computer in the distributed computing system.

In one embodiment of the present invention, the system signs each security policy with a cryptographic signature to allow detection of unauthorized changes.

In one embodiment of the present invention, the system distributes the security policies from a computer in the distributed computing system to a subordinate computer.

In one embodiment of the present invention, the specific security policy for use is selected upon detecting an attack upon the system. Upon detecting the attack, the system determines a security posture to be used, and then uses a specific security policy based on the security posture.

In one embodiment of the present invention, the system uses secure communications for distributing the security posture to each computer in the distributed computing system.

In one embodiment of the present invention, the multiple security policies includes a default security policy that is selected by a computer within the distributed computing system if a specific security policy is defective on that host.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Host Computing Systems

Figure 1:
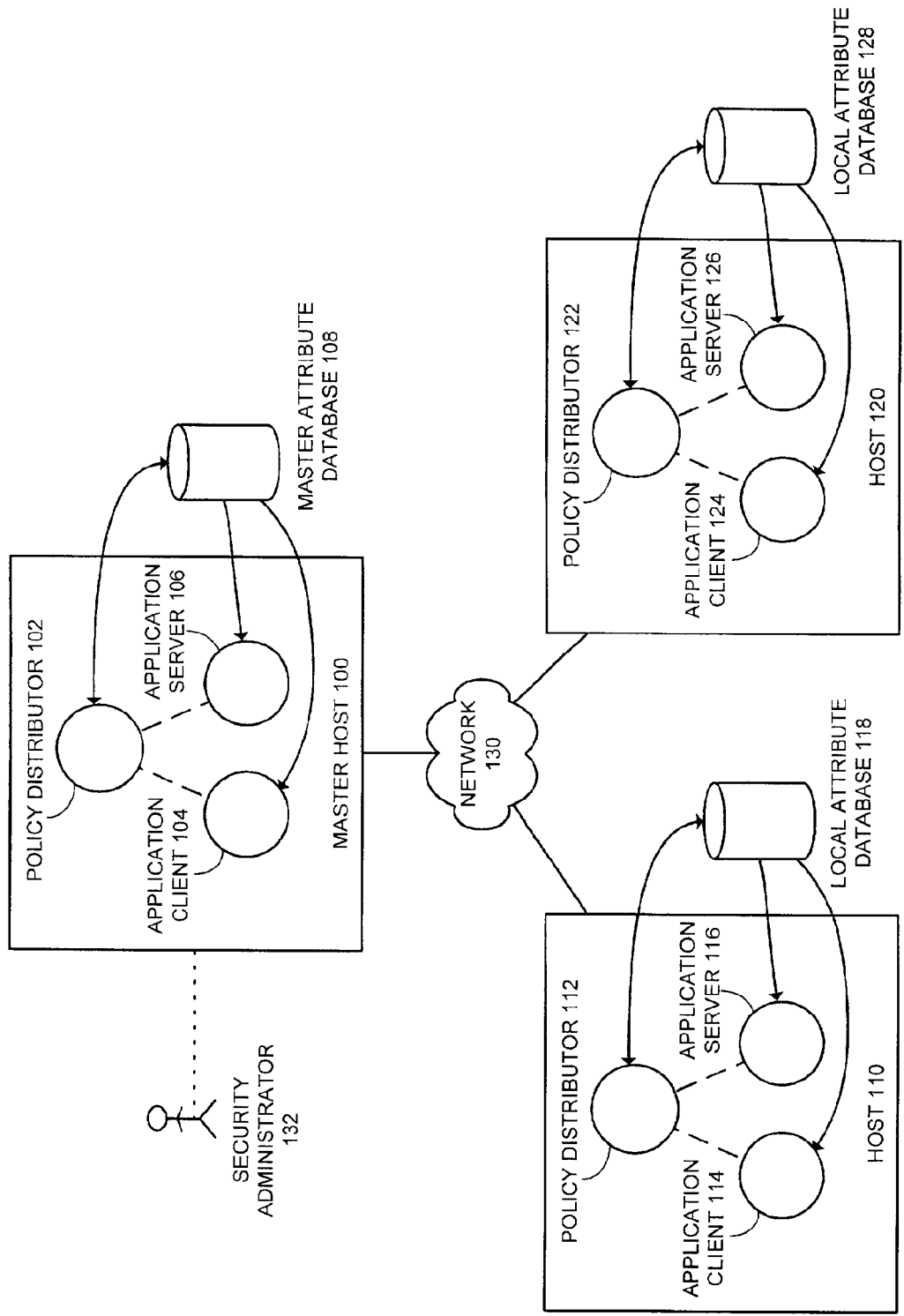
FIG. 1 illustrates host systems coupled together in accordance with an embodiment of the present invention.

FIG. 1 illustrates host systems coupled together in accordance with an embodiment of the present invention. Master host 100, and hosts 110 and 120 are coupled together by network 130. The system can include additional hosts. Master host 100, hosts 110 and 120, and any additional hosts within the system are arranged logically into a hierarchy with master host 100 at the top of the hierarchy. Additional hosts may be arranged to be logically subordinate to master host 100, host 110, host 120, or to any other host within the hierarchy.

Master host 100 and hosts 110 and 120 can generally include any type of computer system, including, but not limited to, a computer system based on a microprocessor, a mainframe computer, a digital signal processor, a portable computing device, a personal organizer, a device controller, and a computational engine within an appliance.

Network 130 can generally include any type of wire or wireless communication channel capable of coupling together computing nodes. This includes, but is not limited to, a local area network, a wide area network, or a combination of networks. In one embodiment of the present invention, network 130 includes the Internet.

Master host 100, and hosts 110 and 120 include configuration transfer agents 102, 112 and 122, application clients 104, 114, and 124, and application servers 106, 116, and 126 respectively. In addition, master host 100, and hosts 110 and 120 are coupled to master policy database 108, and local policy databases 118 and 128 respectively. Any additional host within the system has a configuration equivalent to the configuration of hosts 110 and 120.

During operation of the system, security administrator 132 interacts with master host 100 to create and maintain master policy database 108. The master policy database includes a hierarchy of policy files. The hierarchy of policy files is detailed below in conjunction with FIG. 6.

After master policy database 108 has been created, configuration transfer agent 102 establishes a secure link with configuration transfer agents 112 and 122 within hosts 110 and 120 respectively. Configuration transfer agents 102, 112, and 122 operate in concert to copy master policy database 108 or parts thereof to local policy database 118 and local policy database 128. In like manner, each configuration transfer agent may contact other configuration transfer agents within the system to provide each host within the system a local policy database. Note that master policy database 108 or parts thereof is signed with a cryptographic signature prior to distribution so that tampering with master policy database 108, and local policy databases 118 and 128 can be detected.

Application clients 104, 114, and 124 and application servers 106, 116, and 126 validate user access rights by accessing master policy database 108 and local policy databases 118 and 128 respectively. Application clients 104, 114, and 124 and application servers 106, 116, and 126 are notified by configuration transfer agents 102, 112, and 122 when master policy database 108 and local policy databases 118 and 128 respectively have been updated.

Host Including Security Posture Interpreter

Figure 2:
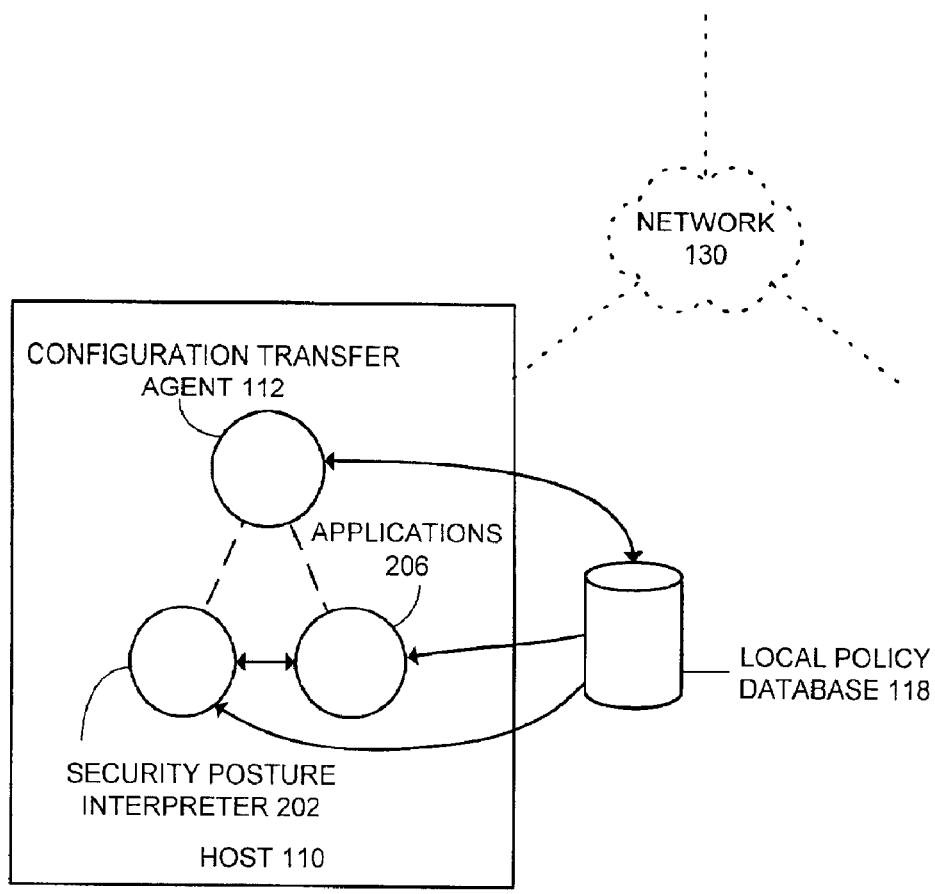
FIG. 2 illustrates host 110 including security posture interpreter 202 in accordance with an embodiment of the present invention.

FIG. 2 illustrates host 110 including security posture interpreter 202 in accordance with an embodiment of the present invention. Host 110 from FIG. 1 is representative of all hosts coupled together in a distributed computing system. Master host 100, host 120 and all other hosts within the distributed computing system have a similar configuration. In this embodiment of the present invention, host 110 includes applications 206, security posture interpreter 202 and local policy database 118.

Applications 206 includes any computer applications being processed by application client 114 and application server 116 from FIG. 1. In operation, an application within applications 206 can register with security posture interpreter 202. In return security posture interpreter 202 can return the current security policy to the application.

Security posture interpreter 202 receives the current security posture from local policy database 204 as discussed below in conjunction with FIGS. 3 and 6. Security posture interpreter 202 also receives registrations from applications 206. Upon receipt of a registration, security posture interpreter 202 returns the current security posture to the application being registered. In response to a change in current policy 622 as described below in conjunction with FIGS. 3 and 6, security posture interpreter 202 notifies all registered applications within applications 206 of the change in current policy 622.

Local policy database 204 is a hierarchical database, which includes pre-positioned policies and current posture indicator 622 as described below in conjunction with FIG. 6. By pre-positioning the policies, the security posture of host 110 can be changed very quickly in response to a change in security posture of the system.

Security Posture Interpreter

Figure 3:
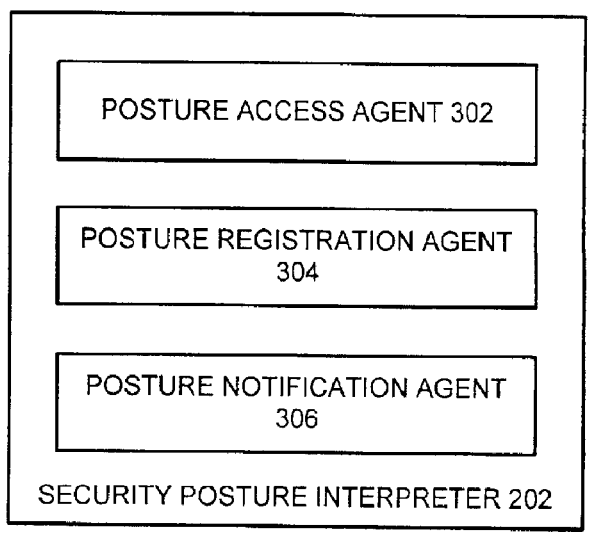
FIG. 3 illustrates security posture interpreter 202 in accordance with an embodiment of the present invention.

FIG. 3 illustrates security posture interpreter 202 in accordance with an embodiment of the present invention. Security posture interpreter 202 includes posture access agent 302, posture registration agent 304, and posture notification agent 306.

Upon notification of a new security posture by configuration transfer agent 112, posture access agent 302 determines the current security posture by accessing current policy 622 within local policy database 204. Posture access agent 302 provides the current security posture to posture notification agent 306.

Posture registration agent 304 provides access for applications 206 to register with security posture interpreter 202. When an application within applications 206 registers with posture registration agent 304, the application provides a call-back address so that posture notification agent 306 can notify the application when the current security posture changes.

After posture notification agent 306 receives notification from configuration transfer agent 112 that current policy 622 has changed, posture notification agent 306 notifies all registered applications of the change in the current security posture.

Detecting an Attack

Figure 4:
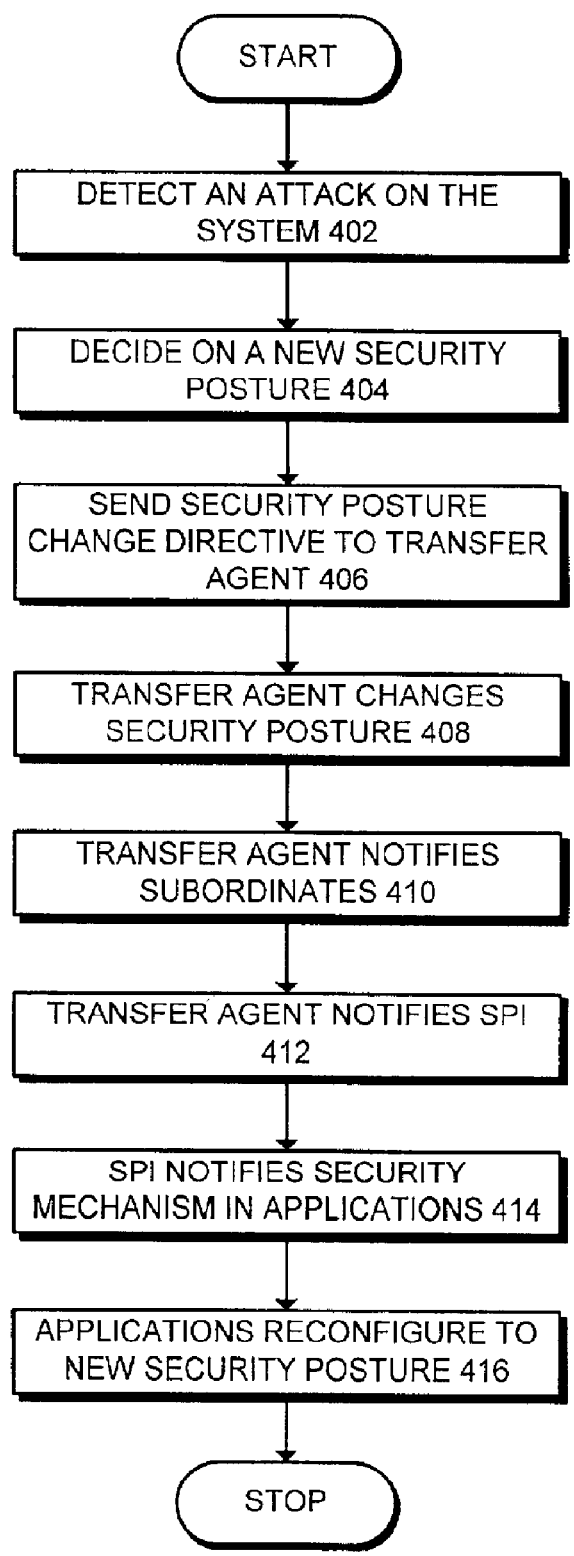
FIG. 4 is a flowchart illustrating detecting an attack on the system and changing security posture in response to the attack in accordance with an embodiment of the present invention.

FIG. 4 is a flowchart illustrating detecting an attack on the system and changing security posture in response to the attack in accordance with an embodiment of the present invention. The system starts when security administrator 132 detects an attack on the system (step 402). In response to detecting an intrusion, security administrator 132 decides on a security posture change directive for the distributed network (step 404). Next, the security posture change directive is sent to configuration transfer agent 102 (step 406).

Configuration transfer agent 102 changes the security posture in master policy database 108 (step 408). Configuration transfer agent 102 also notifies subordinate configuration transfer agents of the new security posture (step 410).

After the security posture change directive has been successfully received at the local host, associated configuration transfer agent 112 notifies associated security posture interpreter 202 of the new security posture (step 412). Next, security posture interpreter 202 notifies the security mechanism in registered applications 206 of the new security posture (step 414). Finally, applications 206 reconfigure to the new security posture (step 416).

Notifying Applications of a New Security Posture

Figure 5:
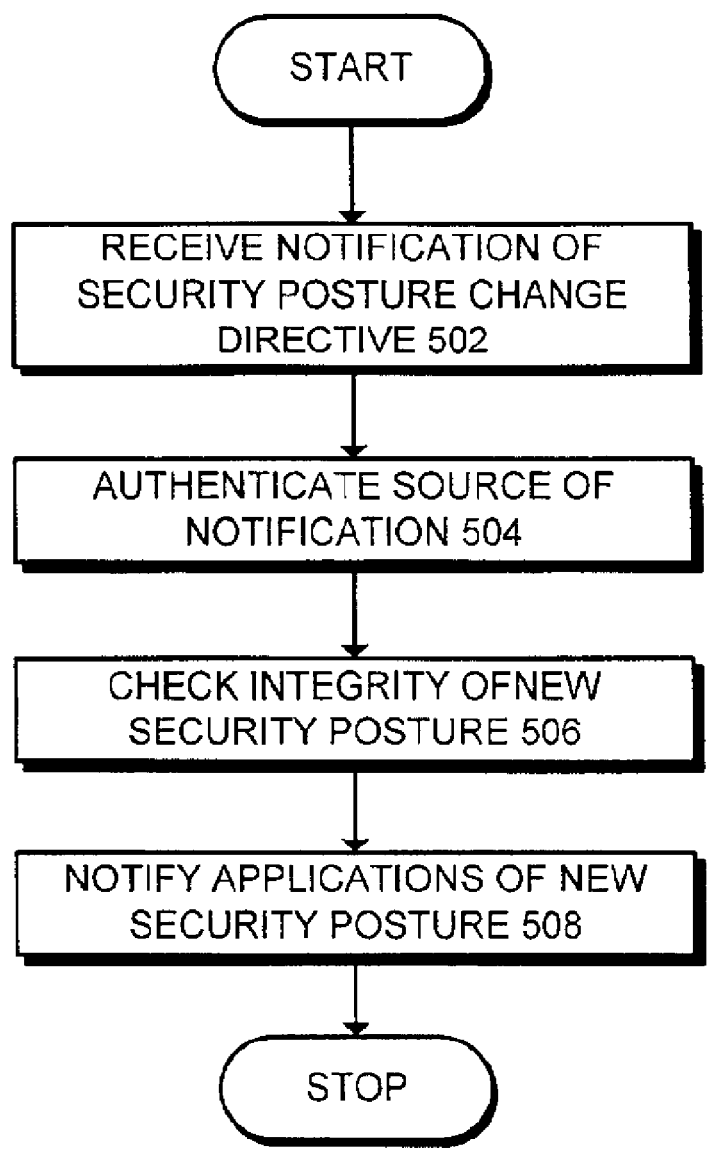
FIG. 5 is a flowchart illustrating the process of notifying applications of a new security posture in accordance with an embodiment of the present invention.

FIG. 5 is a flowchart illustrating the process of notifying applications of a new security posture in accordance with an embodiment of the present invention. The system starts when a security posture interpreter, for example security posture interpreter 202, receives notification of a new security posture (step 502). Upon receipt of this notification, security posture interpreter 202 authenticates the source of the notification (step 504).

After authenticating the source of the notification, security posture interpreter 202 checks the integrity of the new security posture (step 506). Finally, security posture interpreter 202 notifies all applications that have registered with security posture interpreter 202 of the new security posture (step 508).

Local Policy Database

Figure 6:
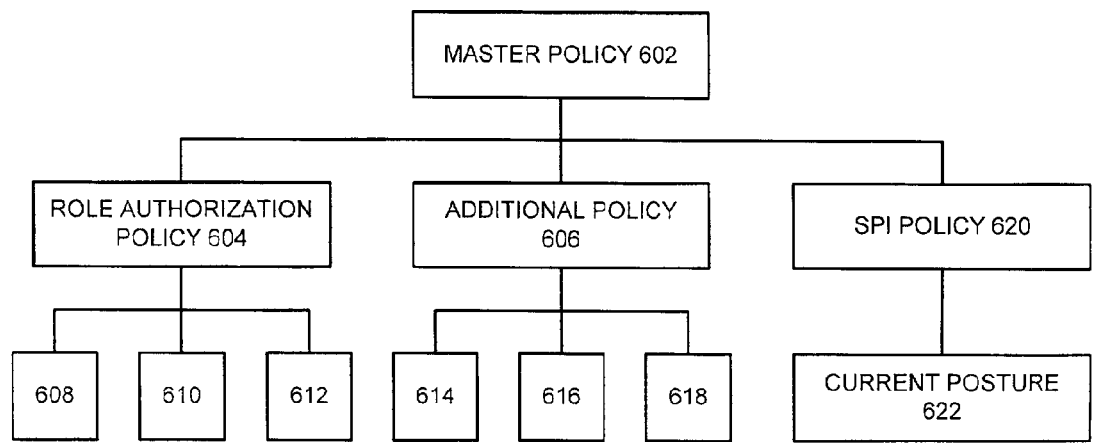
FIG. 6 illustrates security policy data structures in accordance with an embodiment of the present invention.

FIG. 6 illustrates local policy database 204 in accordance with an embodiment of the present invention. Local policy database 204 is a hierarchical data structure of directories and files, which includes detailed security policies for use by applications 206. Master policy 602 is a top-level directory of the hierarchy.

Master policy 602 includes directories for role authorization policy 604, additional policy 606, and security policy interpreter (SPI) policy 620. Role authorization policy 604 and additional policy 606 include files, which define security policies for role authorization policy 604 and additional policy 606, respectively. Note that it will be obvious to a practitioner with ordinary skill in the art that there can be as many additional policy directories as required for a specific distributed computer system. These additional policy directories can be used for any type of security policy being implemented. SPI policy 620 includes current policy 622.

Each policy directory can include multiple policy files, where a policy file specifies a security policy for a specific security posture. For example, file 608 might be a default role authorization policy to use if the policy file specified by current policy 622 is defective or missing. Files 610 and 612 might be specific role authorization policies for specific security postures. Note that there can be as many files as necessary to respond to all security postures. Files 614, 616, and 618 perform the same functions for additional policy 606 as files 608, 610, and 612 do for role authorization policy 604, respectively. In operation, the files comprising local policy database 204 are distributed as described below in conjunction with FIG. 7. These files are created and distributed prior to any need to change security postures, thereby pre-positioning the security policies so that the system can rapidly switch the current security policy.

SPI policy 620 includes current policy 622. Current policy 622 specifies only the current security posture and, as such, is a very small file. When a change in security posture is required, configuration transfer agent 112 need only distribute a new current policy 622 to effect the change in security posture for the entire distributed computing system.

Installing Security Policies

Figure 7:
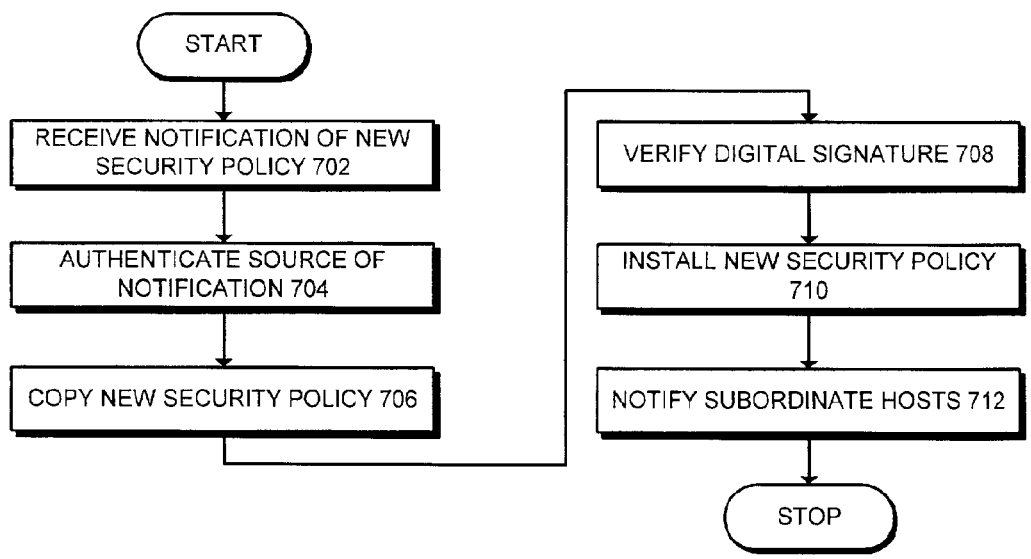
FIG. 7 is a flowchart illustrating distributing new security policies in accordance with an embodiment of the present invention.

FIG. 7 is a flowchart illustrating distributing new security policies in accordance with an embodiment of the present invention. The system starts when a host, for example host 110, receives notification of a new security posture file (step 702). Note that each host in the distributed computing system functions in a similar way so only host 110 will be described herein. The notification of a new security policy can originate from security administrator 132 in the case of master host 100 (see FIG. 1) or from another host within the hierarchy of hosts comprising the distributed computing system.

Upon notification of a new security policy, host 110 authenticates the source of the notification (step 704). After authenticating the source of the notification, host 110 copies the new security policy into local policy database 204 (step 706).

Host 110 then verifies the digital signature included with the new security policy (step 708). Upon verification of the digital signature, host 110 installs the new security posture file in local policy database 204, overwriting any current security policy with the same designation (step 710). Host 110 then notifies any subordinate hosts in the distributed computing system of the new policy (step 712).

Note that the same distribution mechanism is used to distribute current posture 622, thereby ensuring that only authorized changes are propagated through the distributed computing system. Since current posture 622 is small, a change in security posture can be propagated through the system very quickly, even when the system is under attack.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing security policies in a distributed computing system, wherein security policies determine access rights to a computer application, the method comprising:

creating a plurality of security policies, wherein each security policy specifies a level of security for the distributed computing system;

distributing the plurality of security policies to each computer in the distributed computing system;

selecting a specific security policy from the plurality of security policies for use across the distributed computing system; and informing each computer in the distributed computing system to use the specific security policy;

wherein the plurality of security policies includes a default security policy, wherein the default security policy is selected by a computer within the distributed computing system if the specific security policy is defective;

wherein a host is provided including applications, a security posture interpreter, and a local policy database, the applications capable of registering with the security posture interpreter, whereupon registration, the security posture interpreter returns a current security policy to the applications.

2. The method of claim 1, wherein the level of security includes a specific security posture.

3. The method of claim 1, further comprising using secure communications for distributing the plurality of security policies to each computer in the distributed computing system.

4. The method of claim 1, further comprising signing each security policy in the plurality of security policies with a cryptographic signature to allow detection of unauthorized changes.

5. The method of claim 1, further comprising distributing the plurality of security policies from a computer in the distributed computing system to a subordinate computer.

6. The method of claim 1, wherein selecting the specific security policy for use includes selecting the specific security policy based on a security posture.

7. The method of claim 6, wherein informing each computer in the distributed computing system to use the specific security policy includes using secure communications for distributing the security posture indicator to each computer in the distributed computing system.

8. The method of claim 1, wherein the security posture interpreter includes a posture access agent, a posture registration agent, and a posture notification agent, whereupon notification of a Previously Presented security posture, the posture access agent determines a current security posture by accessing the current security policy within the local policy database, the posture access agent provides the current security posture to the posture notification agent, the posture registration agent provides access for the applications to register with the security posture interpreter, whereupon one of the applications registering with the posture registration agent, the application provides a call-back address so that the posture notification agent notifies the application when the current security posture changes.

9. The method of claim 8, whereupon the posture notification agent receiving notification that the current security policy has changed, the posture notification agent notifies the registered applications of the change in the current security posture.

10. The method of claim 9, wherein the local policy database includes a hierarchical data structure of directories and files, a top-level directory of the directories including a master policy with directories for a role authorization policy, an additional policy, and a security policy interpreter policy, the role authorization policy and additional policy including files which define the security policies for the role authorization policy and additional policy, each directory including multiple flies, where each file specifies the security policy for a particular security posture.

11. A computer-readable storage medium storing instructions that when executed by a computer cause the computer to perform a method for managing security policies in a distributed computing system, wherein security policies determine access rights to a computer application, the method comprising:

creating a plurality of security policies, wherein each security policy specifies a level of security for the distributed computing system;

distributing the plurality of security policies to each computer in the distributed computing system;

selecting a specific security policy from the plurality of security policies for use across the distributed computing system; and informing each computer in the distributed computing system to use the specific security policy;

wherein the plurality of security policies includes a default security policy, wherein the default security policy is selected by a computer within the distributed computing system if the specific security policy is defective;

wherein a host is provided including applications, a security posture interpreter, and a local policy database, the applications capable of registering with the security posture interpreter, whereupon registration, the security posture interpreter returns a current security policy to the applications.

12. The computer-readable storage medium of claim 11, wherein the level of security includes a specific security posture.

13. The computer-readable storage medium of claim 11, wherein the method further comprises using secure communications for distributing the plurality of security policies to each computer in the distributed computing system.

14. The computer-readable storage medium of claim 11, wherein the method further comprises signing each security policy in the plurality of security policies with a cryptographic signature to allow detection of unauthorized changes.

15. The computer-readable storage medium of claim 11, wherein the method further comprises distributing the plurality of security policies from a computer in the distributed computing system to a subordinate computer.

16. The computer-readable storage medium of claim 11, wherein selecting the specific security policy far use includes selecting the specific security policy based on a security posture.

17. The computer-readable storage medium of claim 16, wherein informing each computer in the distributed computing system to use the specific security policy includes using secure communications for distributing the security posture to each computer in the distributed computing system.

18. An apparatus that facilitates managing security policies in a distributed computing system, wherein security policies determine access rights to a computer application, the apparatus comprising:

a creating mechanism configured to create a plurality of security policies, wherein each security policy specifies a level of security for the distributed computing system;

a distributing mechanism configured to distribute the plurality of security policies to each computer in the distributed computing system;

a selecting mechanism configured to select a specific security policy from the plurality of security policies for use across the distributed computing system; and an informing mechanism configured to inform each computer in the distributed computing system to use the specific security policy;

wherein the plurality of security policies includes a default security policy, wherein the default security policy is selected by a computer within the distributed computing system if the specific security policy is defective;

wherein a host is provided including applications, a security posture interpreter, and a local policy database, the applications capable of registering with the security posture interpreter, whereupon registration, the security posture interpreter returns a current security policy to the applications.

19. The apparatus of claim 18, wherein the level of security includes a specific security posture.

20. The apparatus of claim 18, further comprising a secure communications mechanism that is configured to distribute the plurality of security policies to each computer in the distributed computing system.

21. The apparatus of claim 18, further comprising a signing mechanism that is configured to sign each security policy in the plurality of security policies with a cryptographic signature to allow detection of unauthorized changes.

22. The apparatus of claim 18, wherein the distributing mechanism is further configured to distribute the plurality of security policies from a computer in the distributed computing system to a subordinate computer.

23. The apparatus of claim 18, wherein the selecting mechanism includes a policy selecting mechanism that is configured to select the specific security policy based on the security posture.

24. The apparatus of claim 23, wherein the informing mechanism includes a secure communications mechanism for distributing the security posture to each computer in the distributed computing system.

* * * * *

UNITED STATES PATENT AND TRADEMARK OFFICE
CERTIFICATE OF CORRECTION

PATENT NO. : 6,920,558 B2  Page 1 of 1
APPLICATION NO. : 09/863145
DATED : July 19, 2005
INVENTOR(S) : Sames et al.

It is certified that error appears in the above-identified patent and that said Letters Patent is hereby corrected as shown below:

In the claims:
col. 8, line 42, change "far" to --for--.

Signed and Sealed this

Thirtieth Day of November, 2010

David J. Kappos
*Director of the United States Patent and Trademark Office*